United States Patent

Aoyagi et al.

[11] Patent Number: 6,112,771
[45] Date of Patent: Sep. 5, 2000

[54] REINFORCED PRESSURE HOSE

[75] Inventors: Nasuo Aoyagi, Hiratsuka; Norio Kimura, Ibaraki-ken, both of Japan

[73] Assignee: Yokohama Rubber Co., Ltd., Tokyo, Japan

[21] Appl. No.: 08/639,342

[22] Filed: Apr. 26, 1996

[30] Foreign Application Priority Data

| Apr. 28, 1995 | [JP] | Japan | 7-106510 |
| Apr. 28, 1995 | [JP] | Japan | 7-106515 |
| Oct. 24, 1995 | [JP] | Japan | 7-275650 |
| Apr. 24, 1996 | [JP] | Japan | 8-102272 |

[51] Int. Cl.$^7$ .................................................. F16L 11/10
[52] U.S. Cl. ........................... 138/127; 138/126; 138/153
[58] Field of Search ................... 138/126, 127, 138/124, 153

[56] References Cited

U.S. PATENT DOCUMENTS

| 4,153,079 | 5/1979 | Ambrose | 138/124 |
| 4,259,991 | 4/1981 | Kutnyak | 138/125 |
| 4,273,160 | 6/1981 | Lowles | 138/126 |
| 4,308,896 | 1/1982 | Davis | 138/125 |
| 4,384,595 | 5/1983 | Washkewicz et al. | 138/124 |
| 4,585,035 | 4/1986 | Piccoli | 138/126 |
| 5,014,751 | 5/1991 | Wakabayashi et al. | 138/127 |
| 5,110,644 | 5/1992 | Sparks et al. | 138/124 |
| 5,244,016 | 9/1993 | Kuroda et al. | 138/124 |
| 5,372,163 | 12/1994 | Kokuryu et al. | 138/153 |
| 5,499,661 | 3/1996 | Odru et al. | 138/153 |

FOREIGN PATENT DOCUMENTS

| 0 024 512 | 3/1981 | European Pat. Off. . |
| 51-42095 | 8/1975 | Japan . |
| 1-33904 | 11/1983 | Japan . |
| A2 059538 | 4/1981 | United Kingdom . |

OTHER PUBLICATIONS

Patent Abstracts of Japan, vol. 94, No. 012, JP–A–06 34466 (Yokohama Rubber) (Abstract). Dec. 1994.

*Primary Examiner*—Denise L. Ferensic
*Assistant Examiner*—James F. Hook
*Attorney, Agent, or Firm*—Finnegan, Henderson, Farabow, Garrett & Dunner, L.L.P.

[57] ABSTRACT

A reinforced pressure hose for use in boring or other construction work comprises a rubber core tube, a rubber cover tube or sheath and a plurality of reinforcing layers interposed therebetween and adapted for reinforcement against pressure imposed upon the core tube, reinforcement against tensile load and reinforcement further against wear of the hose. The tensile reinforcing or bearing layer is formed from a web of organic fibers knitted at a selected bias angle such that the hose can withstand increased tensile forces while retaining sufficient flexibility to facilitate bending as when it is taken up on a reel. The bias angle relationship between the various reinforcing layers is set so as to allow easy removal of the hose from a mandrel.

6 Claims, 5 Drawing Sheets

REINFORCED PRESSURE HOSE

BACKGROUND OF THE INVENTION

1. Field of the Invention

This invention relates generally to high-pressure fluid conducting hoses and particularly to a hose structure incorporating a plurality of reinforcing layers.

2. Prior Art

There are known numerous reinforced pressure hoses for conducting operating fluids for boring drilling or other construction machineries. Such hoses are wound on reels when not in use and taken out or unreeled at the site of construction. The hose is thus repeatedly subjected to bending and longitudinal tensile forces as well as frictional forces applied to the cover tube.

One of the prior art reinforced pressure hoses is depicted in FIG. 9 of the accompanying drawings in which the hose 100 measuring about 25 mm in diameter comprises a rubber core tube 101, a first reinforcing layer 102, an intermediate rubber layer 103 interposed therebetween, a second reinforcing layer 104 and a rubber cover tube or sheath 105. The first and second reinforcing layers 102 and 104 are braided or knitted helically with metallic wires at a stationary bias angle (hereinafter defined) of approximately 109.5°. With such stationary bias angle, the hose would undergo an elongation in tension of as much as 8% or greater against an applied load of 250 kgf or greater than 40% against a load of 1,000 kgf.

Another prior art hose is disclosed in Japanese Utility Model Publication No. 51-42095 in which the hose features the use of a wire braided reinforcing layer knitted at a stationary bias angle of 109.5° for combatting internal pressure applied to the core tube and a yarn braided reinforcing layer knitted at a bias angle (hereinafter defined) of 60°–90° and having a yarn elongation at break of 8%–14% for protecting the hose against tensile forces exerted longitudinally thereof. The latter reinforcing layer would contribute to objectionably increased hose elongation due to intrinsic limitation of the yarns in resistance to tensile load and further to damage of the cover tube from increased frictional forces when the hose is stretched in its lengthwise direction.

A further prior art hose is disclosed in Japanese Utility Model Publication No. 1-33904 wherein there is shown a reinforced pressure hose comprising a plurality of metal wire reinforcing layers disposed between a core and a cover tube and intermediate rubber layers interposed between adjacent reinforcing layers. One of the reinforcing layers adapted to reinforcement against internal operating pressure has a stationary bias angle of 109.5°, and the other reinforcing layer assigned to reinforcement against tensile load has a bias angle of between 80° and 100°. A hose of this type is highly flexible and hence easy to take up on a reel, but susceptible to excessive elongation as when exposed to a tensile load of say greater than 5 tons, leading to increased permanent stretch set. Attempts to reduce the extent of elongation by selecting a bias angle of smaller than 80° for the tensile reinforcement layer would result in too much elongation of the hose, making it harder to wind up into a roll.

A still another prior art illustrated in FIG. 10 is directed to a hose 200 comprising a rubber core tube 201, a first reinforcing layer 202, a second reinforcing layer 203, a rubber intermediate layer 204 interposed therebetween, a third reinforcing layer 205, a rubber layer 206 disposed between the second and third reinforcing layers, and a rubber cover tube 207. The first, second and third reinforcing layers are formed of a braid or helical knit of metal wires interlaced at bias angles of $\alpha x$, $\alpha y$ and $\alpha z$, respectively. Since the bias angle $\alpha z$ for the third reinforcing layer 205 is greater than the bias angles ax and $\alpha y$ for the first and second reinforcing layers 202 and 203, this bias angle relationship would result with the third or outermost reinforcing layer 205 restraining the tendency of the first and second reinforcing layers 202, 203 to expand upon removal of the hose from a mandrel. As illustrated in FIG. 11, during mandrel removal the third reinforcing layer 205 will vary in its bias angle from $\alpha z$ to $\alpha z'$ corresponding to a radial expansion of $S_2$, whereas the first or second reinforcing layer will shift in bias angle from $\alpha x$ to $\alpha x'$ corresponding theoretically to a radial expansion of $S_1$. However, in the prior art hose of FIG. 9 where the bias angle relation is $\alpha x < \alpha z$ and hence the radial expansion relation is $S_2 < S_1$, the tendency of the first and second reinforcing layers 202, 203 to expand to a value of $S_1$ is in fact hindered or restricted to a value of the difference between $S_1$ and $S_2$ (i.e., $S_1 - S_2$) as the result of the third reinforcing layer having a knit bias angle greater than that of the first or second reinforcing layer. Thus, the hose 200 is rendered difficult to draw out from the mandrel around which it has been wrapped.

SUMMARY OF THE INVENTION

With the drawbacks of the foregoing prior art in view, the present invention seeks to provide a reinforced pressure hose which incorporates a plurality of reinforcing layers of such a knit structure which will ensure moderate flexibility, high resistance to tensile forces and external wear of the hose.

The invention further seeks to provide a reinforced pressure hose which can be smoothly removed from a mandrel.

According to one aspect of the invention, there is provided a reinforced pressure hose which comprises a rubber core tube, a rubber cover tube and a plurality of reinforcing layers interposed therebetween and including at least one pressure bearing reinforcement layer surrounding the core tube and at least one tensile bearing reinforcement layer surrounded by the cover tube, the tensile bearing reinforcement layer being formed from a web of organic fibers having an elongation at break of less than 6% and a tensile strength of 15 gf per denier and knitted at a bias angle in the range of between 30° and 80°.

According to another aspect of the invention, there is provided a reinforced pressure hose which comprises a rubber core tube, a rubber cover tube and a plurality of reinforcing layers interposed therebetween and including at least one pressure bearing reinforcement layer surrounding the core tube, at least one tensile bearing reinforcement layer and a wear resistant reinforcement layer formed from a wire braid and interposed between the tensile bearing reinforcement layer and the cover tube.

The invention will be better understood from the following detailed description taken in conjunction with the accompanying drawings in which like reference numerals refer to like or corresponding parts throughout the several views.

DETAILED DESCRIPTION OF THE INVENTION

The term "bias angle" as used herein refers to one of the two angles at which two sets of yarns or wires intersect in a knitted web forming a reinforcing layer of a hose structure, said one angle being open and oriented along the longitudinal axis of the hose.

The term "stationary bias angle" as used herein denotes such a bias angle of the above definition which is assumed when the hose is fully inflated to a working level.

Figure 1:
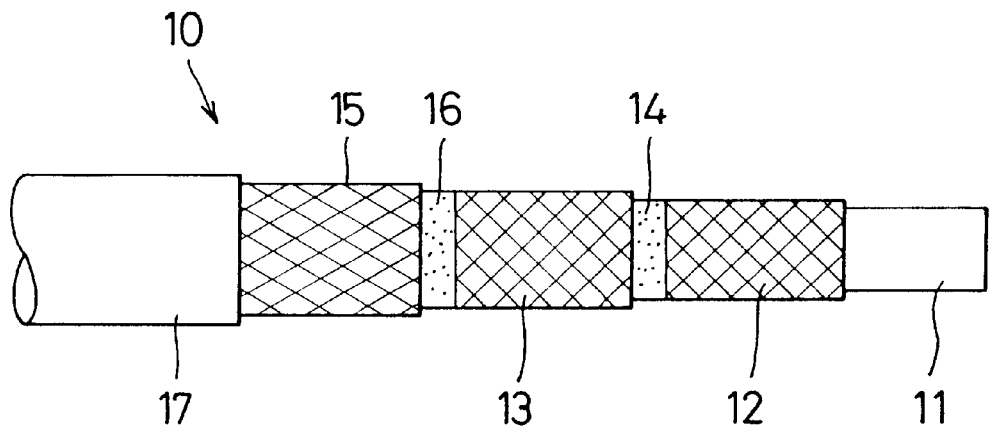
FIG. 1 is a cut away side elevational view of a hose constructed in accordance with a first embodiment of the invention.

Referring now to the drawings and FIG. 1 in particular, there is shown a reinforced pressure hose 10 according to a first embodiment of the invention which comprises a core tube of rubber 11, a first reinforcing layer 12 of wires or yarns knitted or braided around the core tube 11, a second reinforcing layer 13 of wires or yarns, a first intermediate rubber layer 14 interposed and connecting between the first and second reinforcing layers 12, 13, a third reinforcing layer 15 of organic fibrous yarns, a second intermediate rubber layer 16 interposed and connecting between the second and third reinforcing layers 13, 15, and a cover tube or sheath of rubber 17 extruded or otherwise molded over the third reinforcing layer 15. The fibrous yarns forming the third reinforcing layer 15 have an elongation at break of less than 6%, preferably less than 4% and a tensile strength per denier of more than 15 gf/d, preferably more than 20 gf/d. Elongation values of greater than 6% would give rise to undue hose stretch as the result of a stretch due to angular variations being combined with a stretch of yarns per se when the hose is subjected to tensile load. Tensile strength values of smaller than 15 gf/d would be detrimental to resistance to increased tensile force, or would otherwise require larger quantities of yarns to provide a compensatory strength, leading to larger hose diameters and greater bending forces. Preferred examples of such organic fibers include polyparaphenylenebenzo-bis-oxazole (PBO) fibers, aromatic polyester (polyacrylate) fibers and aromatic polyamide (aramide) fibers. The reinforcing layers 12 and 13 are braided or knitted with a stationary bias angle in the neighborhood of 109.5° and adapted to reinforce against or bear the burden of pressures imposed internally of the core tube 11.

The third reinforcing layer 15 is knitted with one of the above exemplified organic fibers at a bias angle in the range of between 30° and 100° and adapted to reinforce against or bear the burden of tensile load applied to the hose 10 when the latter is stretched lengthwise. Bias angles of smaller than 30° for the third reinforcing layer 15 would result in reduced hose elongation with respect to tensile load but would lead to increased bending forces, making the hose less flexible. Bias angles larger than 100° would result with a hose being highly flexible and hence easier to bend but liable to undue stretch under increased tensile load and hence less durable.

Figure 2:
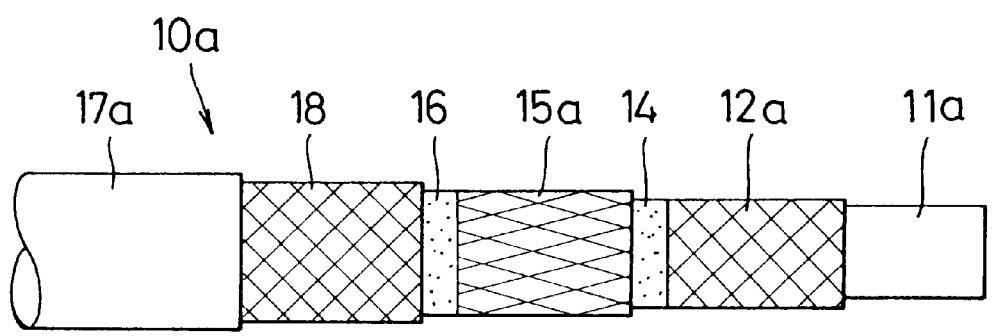
FIG. 2 is a cut away side elevational view of a hose according to a second embodiment of the invention.

FIG. 2 shows a hose structure 10a according to a second embodiment of the invention which comprises a rubber core tube 11a, a first reinforcing layer 12a similar to the reinforcing layer 12 or 13 for reinforcement against internal pressures imposed upon the core 11a, a second reinforcing layer 15a similar to the reinforcing layers 15 in construction and function, a third reinforcing layer 18 for reinforcement against external forces tending to damage the hose and a cover or sheath 17a wrapped around the third reinforcing layer 18. This hose structure is characterized by the provision of the third reinforcing layer 18 which is formed from steel wires braided at a bias angle of approximately 109.5° over the intermediate rubber layer 16.

Figure 3:
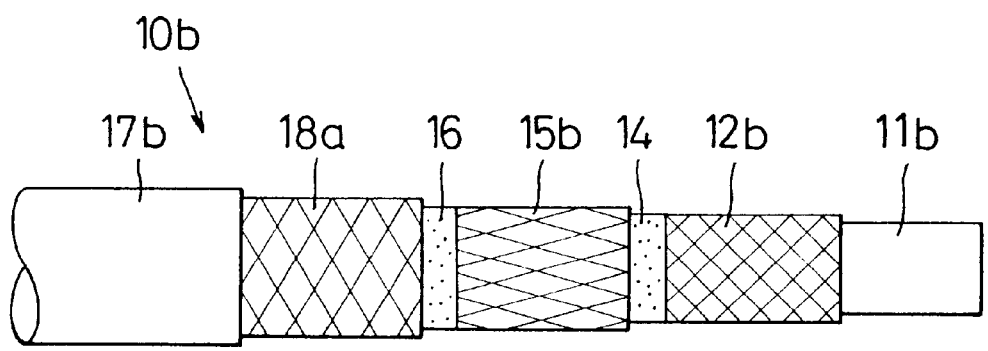
FIG. 3 is a cut away side elevational view of a hose according to a third embodiment of the invention.

FIG. 3 shows a hose 10b according to a third embodiment of the invention which is substantially similar in construction and function to the hose of the second embodiment shown in FIG. 2, except that the third reinforcing layer 18a of the hose 10b is formed of a wire braid having an increased bias angle of larger than 109.5° such that the hose 10b can be more easily bent as when it is wound up on a reel.

For purposes of illustration, the inventive hose structures 10, 10a and 10b hereinabove described each are built with a core tube (11, 11a and 11b) having an inner diameter of 31.8 mm, a pressure bearing reinforcement layer (12, 13, 12a and 12b) formed from a braid of wires measuring 0.35 mm in diameter, a tensile bearing reinforcement layer (15, 15a and 15b) formed from a knit of aromatic polyamide fibers measuring 1500 d/2 diameter, and a wear resistant reinforcement layer (18 and 18b) formed from a braid of steel wires measuring 0.20 mm in diameter.

Figure 4:
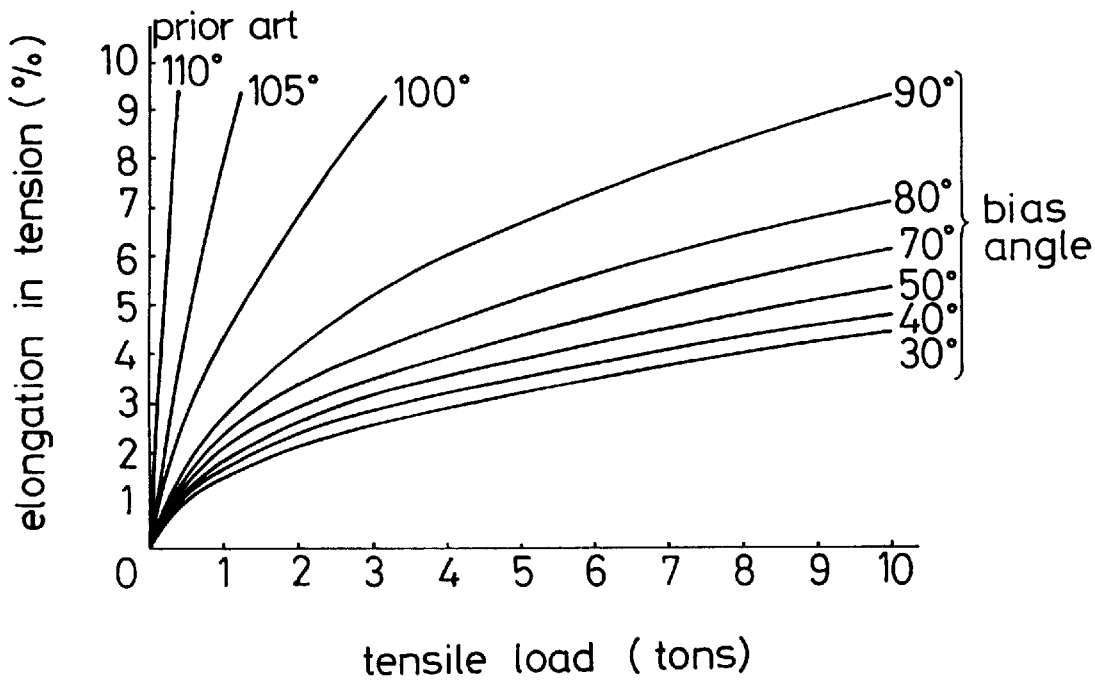
FIG. 4 is a graph illustrating the relationship between tensile load and elongation of the prior art and the inventive hoses.

The inventive hoses were compared with the prior art counterparts for elongation in tension relative to applied tensile load with the results graphically displayed in FIG. 4, from which it will be seen that the inventive hoses each incorporating the tensile bearing layers 15, 15a and 15b of a fibrous knit structure having a bias angle in the range of between 30° and 100° are relatively small in elongation (%) against tensile load (tons) as compared to the prior art hoses.

Figure 5:
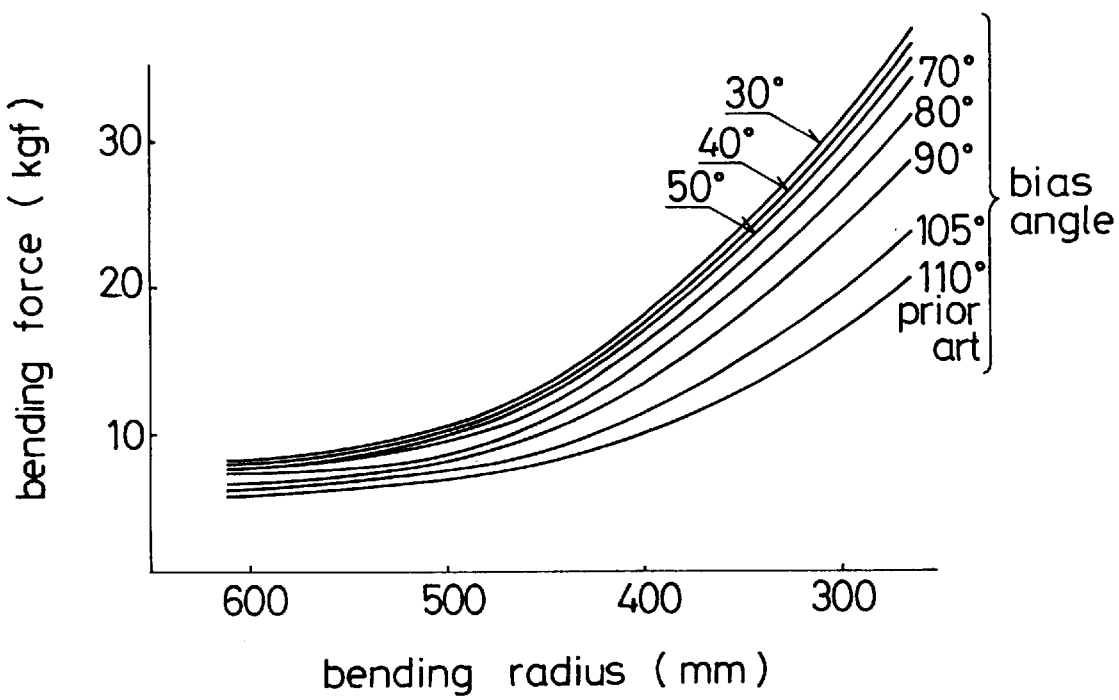
FIG. 5 is a graph illustrating the relationship between bending forces and bending radii of the prior art and the inventive hoses.

A further comparison was made for bending with the results graphically illustrated in FIG. 5, from which it will be seen that the inventive hoses can be bent with a relatively small bending force and hence reeled up with greater ease.

Figure 6:
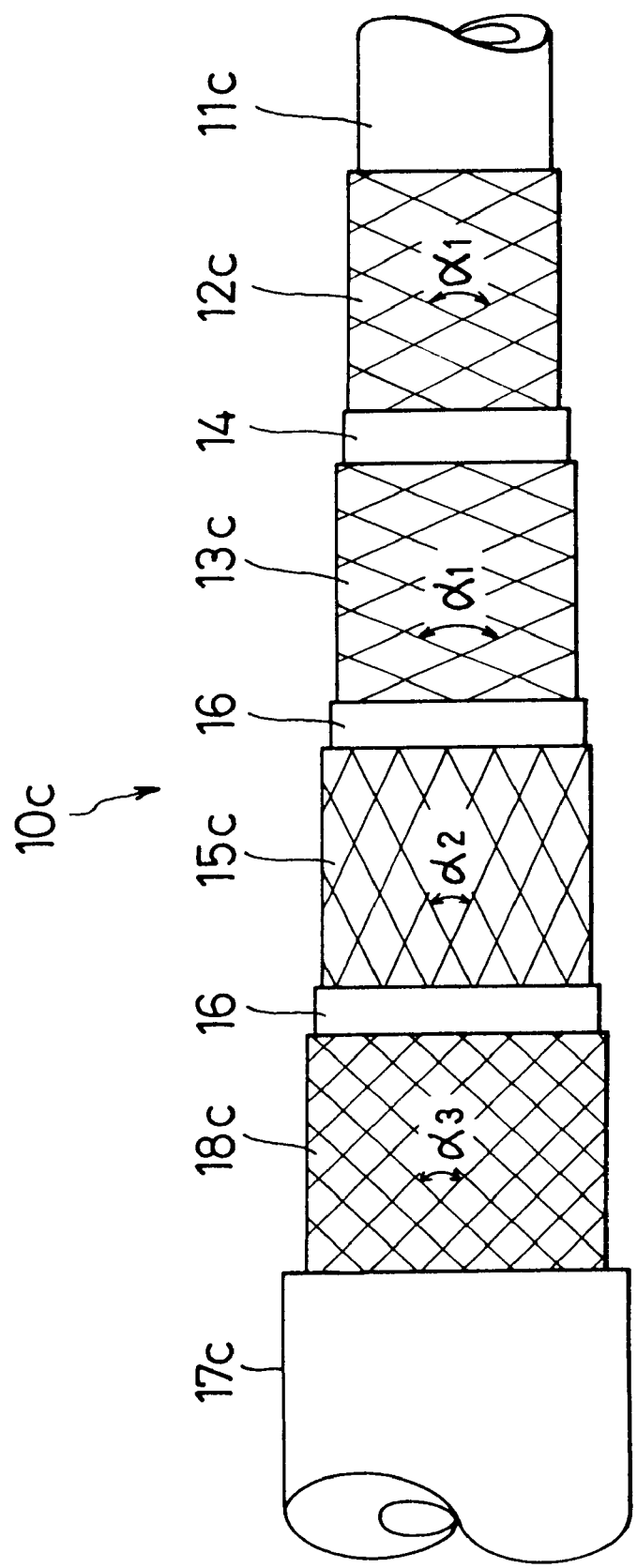
FIG. 6 is a cut away side elevational view of a hose according to a fourth embodiment of the invention.

There is shown in FIG. 6 a reinforced pressure hose 10c constructed in accordance with a fourth embodiment of the invention which comprises two pressure bearing reinforcement layers 12c and 13c similar to but somewhat larger in bias angle α1 (between 107° and 110°) than the counterparts 12 and 13 in the first embodiment hose 10, a tensile bearing reinforcement layer 15c having a bias angle α2 of about 70° and a wear resistant reinforcement layer 18c having a bias angle α3 of between 94° and 110°

The hose structure 10c of the fourth embodiment is devised particularly for facilitating removal from a mandrel in the course of its manufacture.

Figure 7:
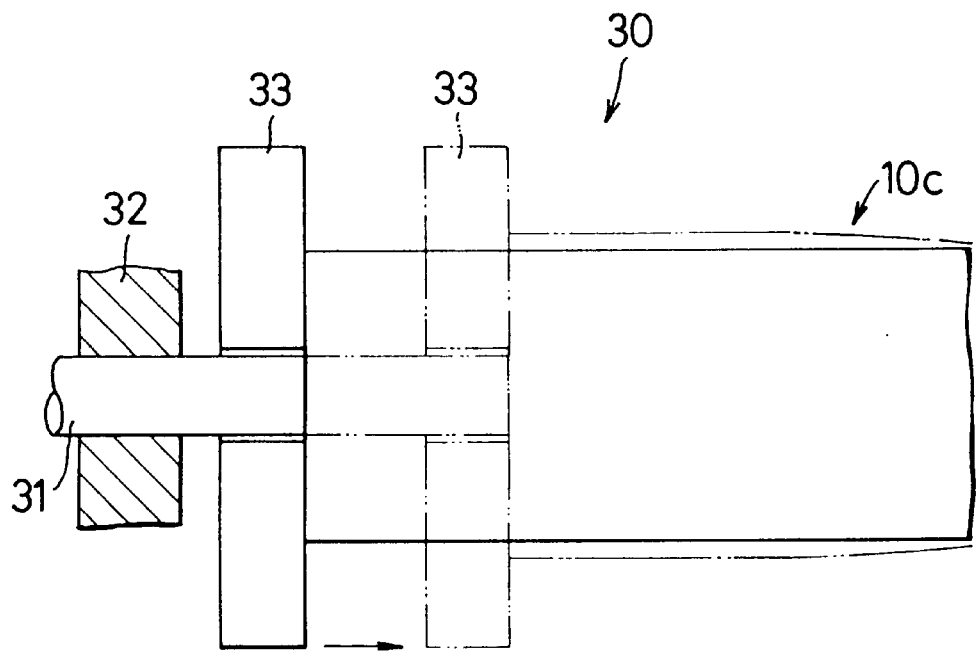
FIG. 7 schematically illustrates a mandrel having a hose wrapped therearound and the manner in which it is released.
Figure 8:
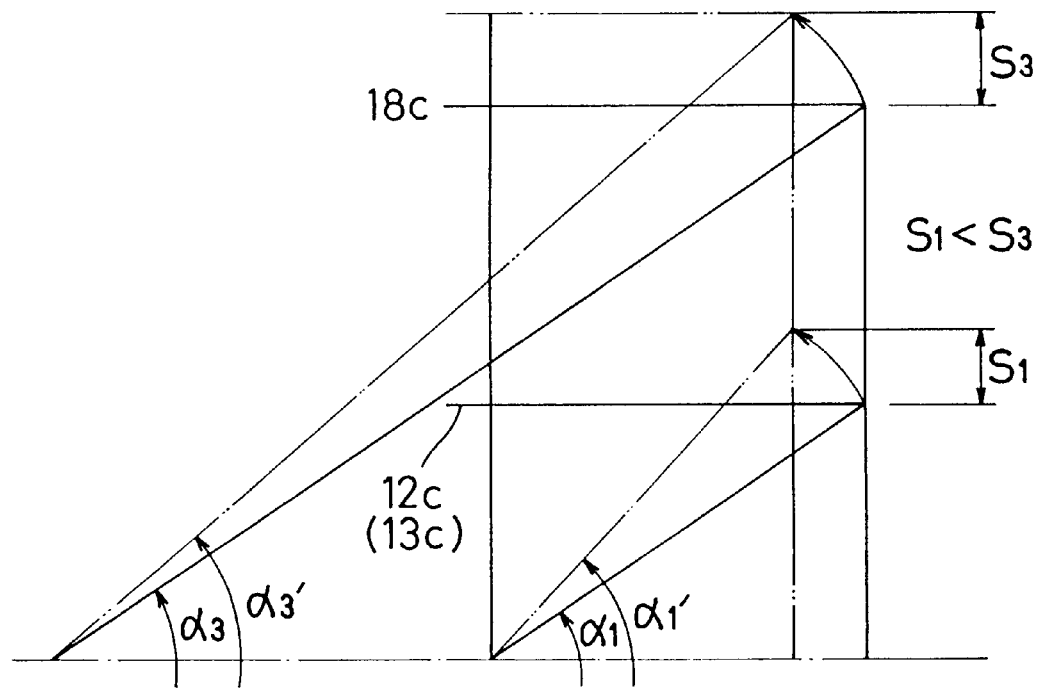
FIG. 8 graphically illustrates the variations of bias angles of the reinforcing knit layers when the inventive hose is removed from the mandrel.
Figure 9:
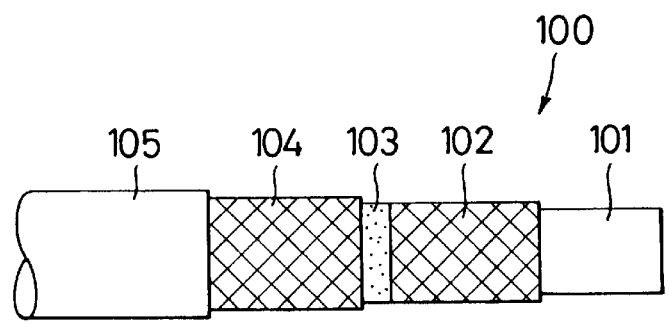
FIG. 9 is a cut away side elevation of a prior art hose.
Figure 10:
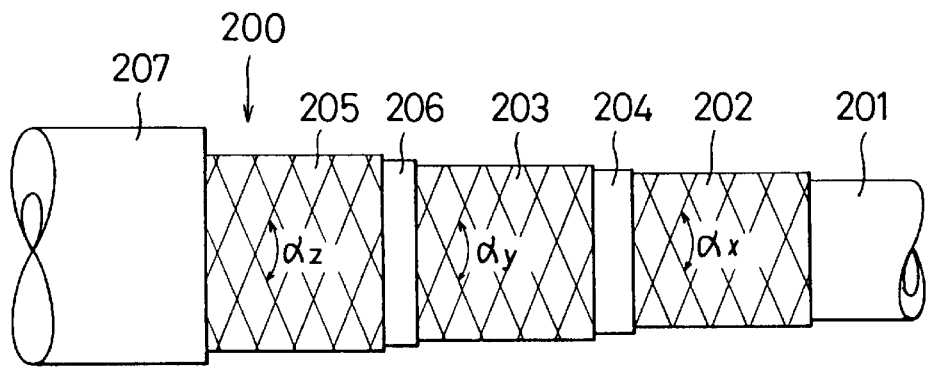
FIG. 10 is a cut away side elevation of another prior art hose.
Figure 11:
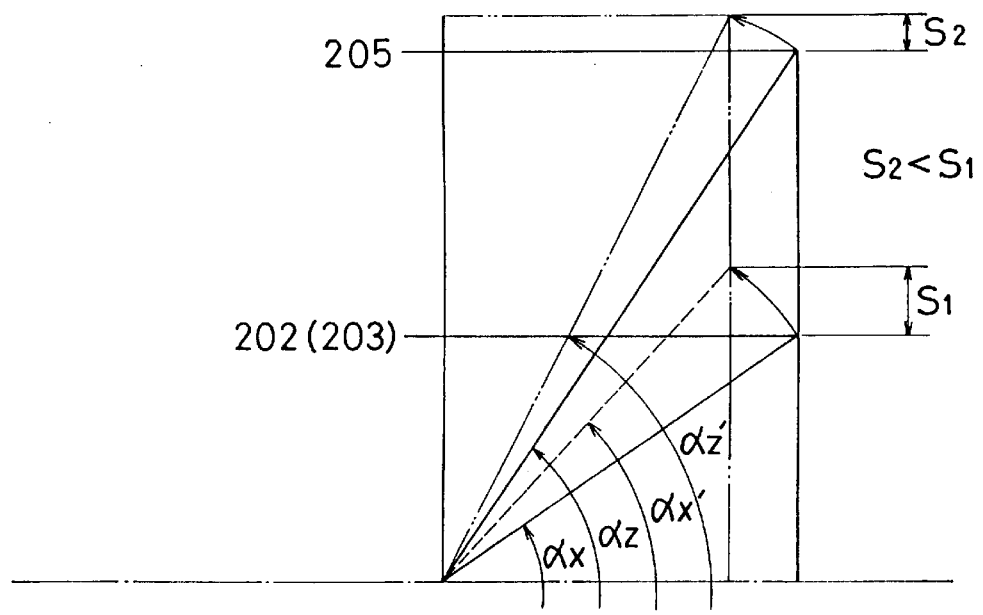
FIG. 11 graphically illustrates the variations of bias angles of the reinforcing layers of the prior art hose shown in FIG. 10.

FIG. 7 schematically illustrates a hose manufacturing apparatus 30 well known in the art which comprises a mandrel 31 secured at one of its end to a clamp 32 and a carriage 33 movable relative to the mandrel 31 for removing therefrom the hose 10c upon formation. As the carriage 33 moves in the direction of the arrow by a distance indicated by the phantom line, the wear resistance reinforcement layer 18c varies in bias angle from α3 to α3' resulting in a radial expansion of $S_3$, while the pressure bearing reinforcement layer 12c, (13c) changes in its bias angle from α1 to α1' inducing a radial expansion of $S_1$ as illustrated in FIG. 8. Since the bias angle $\alpha3$ for the layer 18c is set at a value equal to or greater than that for the layers 12c, (13c), it follows that the expansion $S_3$ of the former becomes greater than that $S_1$ of the latter, thus indicating freedom of the pressure bearing layer 12c, (13c) from constraining forces which would otherwise be imposed by the wear resistance layer 18c when the hose 10c is removed from the mandrel 31.

It has been found that the relationship between the bias angle $\alpha1$ of the pressure bearing layer 12c, (13c), the bias angle $\alpha2$ of the tensile bearing layer 15c and the bias angle $\alpha3$ of the wear resistant layer 18c is preferably in the order of $\alpha2<\alpha3<\alpha1$ to achieve the best results.

A sample of the inventive hose 10c of the fourth embodiment measuring 25 mm in diameter and 20 meters in length was tested for removability from the mandrel under a compressive pressure of 700 kgf, for breaking pressure according to JIS K 6330 and for impulse according to JIS K 6330 with a trapezoidal wave of 150 kgf/cm² and at a bending radius of 250 mm, with the results shown in Table 1.

Having thus described the invention, it will be obvious to those skilled in the art that various changes and modifications may be made in the foregoing specific embodiments without departing from the scope of the appended claims.

TABLE 1

| | Inventive Examples | | | | |
|---|---|---|---|---|---|
| | 1 | 2 | 3 | 4 | 5 |
| bias angle $\alpha1$ of pressure bearing layers | | | | | |
| (1) | 107° | 107° | 107° | 107° | 107° |
| (2) | 110° | 110° | 110° | 110° | 110° |
| bias angle $\alpha2$ of tensile bearing layer | 70° | 70° | 70° | 70° | 70° |
| bias angle $\alpha3$ of wear resistant layer | 94° | 100° | 107° | 110° | 116° |
| time length for mandrel removal | 10 sec. | 10 sec. | 20 sec. | 40 sec. | 600 sec. (10 min.) |
| breaking pressure kgf/cm² | 770 | 800 | 820 | 830 | 840 |
| Impulse test | million times cleared | million times cleared | million times cleared | million times cleared | million times cleared |
| bending force kgf at bending radius of 250 mm | 12.0 | 9.5 | 8.5 | 8.0 | 75 |

What is claimed is:

1. A reinforced pressure hose which comprises a rubber core tube, a rubber cover tube and a plurality of reinforcing layers interposed therebetween and including at least one pressure bearing reinforcement layer formed of braided wires and surrounding said core tube, and at least one tensile bearing reinforcement layer surrounded by said cover tube and interposed between said cover tube and said pressure bearing reinforcement layer, said tensile bearing reinforcement layer being formed from a web of organic fibers having an elongation at break of less than 6% and a tensile strength of more than 15 g per denier and knitted at a bias angle in the range of between 30° and 80°.

2. A reinforced pressure hose according to claim 1 wherein said pressure bearing reinforcement layer is formed from a braid of steel wires.

3. A reinforced pressure hose according to claim 1 wherein said organic fibers are selected from the group consisting of fibers of a polyparaphenylenebenzo-bis-oxazole, an aromatic polyester and an aromatic polyamide.

4. A reinforced pressure tube which comprises a rubber core tube, a rubber cover tube and a plurality of reinforcing layers interposed therebetween and including at least one pressure bearing reinforcement layer formed of braided wires and surrounding said core tube, at least one tensile bearing reinforcement layer formed of a web of organic fibers knitted at a bias angle of between 30° and 80°, and a wear resistant reinforcement layer formed from a wire braid, said tensile bearing reinforcement layer being interposed between said pressure bearing reinforcement layer and said wear resistant reinforcement layer, and said wear resistant reinforcement layer being interposed between said tensile bearing reinforcement layer and said cover tube.

5. A reinforced pressure tube according to claim 4 wherein said wear resistant reinforcement layer is formed from steel wires braided at a bias angle equal to or greater than that of said pressure bearing reinforcement layer.

6. A reinforced pressure hose according to claim 4 wherein said pressure bearing reinforcement layer, said tensile bearing reinforcement layer and said wear resistant reinforcement layer have bias angles of $\alpha1$, $\alpha2$ and $\alpha3$, respectively, the relationship therebetween being $\alpha2<\alpha3\leq\alpha1$.

* * * * *